US005301526A

United States Patent [19]

Fann et al.

[11] Patent Number: 5,301,526

[45] Date of Patent: Apr. 12, 1994

[54] LOCK SET WITH IMPROVED SPINDLE MECHANISM

[75] Inventors: Yaw-Shin Fann, Chiayi; San-Yi Lin, Yunlin Hsien; Ming-Shyang Chiou, Chiayi; Rong-Faa Wu; Ching-Chuan Kuo, both of Chiayi Hsien, all of Taiwan

[73] Assignee: Tong-Lung Metal Industry Co. Ltd., Taiwan

[21] Appl. No.: 942,292

[22] Filed: Sep. 8, 1992

Related U.S. Application Data

[63] Continuation-in-part of Ser. No. 865,204, Apr. 8, 1992, abandoned.

[51] Int. Cl.[5] .......... B60R 25/02

[52] U.S. Cl. .......... 70/224; 70/216; 70/479; 292/359; 292/169.17

[58] Field of Search .......... 70/215-217, 70/218, 221-224, 467, 468, 472, 473, 475, 477-479, 481, 152; 292/169.17, 169.22, 169.23, 336.3, 336.5, 359

[56] References Cited

U.S. PATENT DOCUMENTS

| | | | |
|---|---|---|---|
| 2,062,598 | 12/1936 | Nelson | 70/472 |
| 2,264,239 | 11/1941 | Hirsh | 70/476 |
| 2,449,711 | 9/1948 | Milligan | 70/478 X |
| 2,709,911 | 6/1955 | Russell | 70/216 X |
| 2,729,090 | 1/1956 | Floraday | 70/223 |
| 2,834,194 | 5/1958 | Schlage et al. | 70/479 |
| 2,842,952 | 7/1958 | Russell | 70/216 |
| 2,959,952 | 11/1960 | Schweitzer | 70/467 X |
| 2,989,332 | 6/1961 | Gilbert | 292/169.17 |
| 2,998,273 | 8/1961 | Unetic | 292/359 X |
| 2,998,274 | 8/1961 | Russell | 292/169.17 |
| 3,035,432 | 5/1962 | De Vines | 70/216 |
| 3,072,427 | 1/1963 | De Vines | 292/169.17 X |
| 3,196,644 | 7/1965 | Russell et al. | 70/224 |
| 3,390,910 | 7/1968 | Kuchler | 70/216 X |
| 3,556,576 | 1/1971 | Nelson et al. | 292/359 |
| 3,726,554 | 4/1973 | Getz, Jr. | 292/169.17 |
| 3,800,573 | 4/1974 | Babb, Jr. et al. | 292/359 X |
| 3,823,585 | 7/1974 | Spon | 292/359 X |
| 4,966,399 | 10/1990 | Lin | 292/359 |
| 5,157,952 | 10/1992 | Lin | 70/216 |

FOREIGN PATENT DOCUMENTS

| | | | |
|---|---|---|---|
| 2061826 | 7/1971 | Fed. Rep. of Germany | 292/359 |

*Primary Examiner*—Peter M. Cuomo
*Assistant Examiner*—Suzanne L. Dino
*Attorney, Agent, or Firm*—Ladas & Parry

[57] ABSTRACT

A lock set for use with a deadbolt which includes an improved spindle mechanism is disclosed. The improved spindle mechanism permits the lock set to unlatch the deadbolt by rotating an inner knob without the need to operate a spindle-turning button.

18 Claims, 13 Drawing Sheets

LOCK SET WITH IMPROVED SPINDLE MECHANISM

BACKGROUND OF THE INVENTION

This application is a continuation-in-part application of U.S. patent application Ser. No. 07/865,204 which was filed on Apr. 8, 1992 and now abandoned.

FIELD OF THE INVENTION

This invention relates to a lock set for use in combination with a deadbolt in a door or the like. Particularly, this invention relates to a lock set including a rotary spindle therein incorporated with a rotary button carried by an inner knob, which button can be turned to lock a deadbolt mechanism.

BRIEF DESCRIPTION OF THE PRIOR ART

Lock sets of the above-mentioned type have existed in several forms. Examples of them are disclosed in an addition application of R.O.C. Patent Application No. 74205214, U.S. Pat. Nos. 3,035,432, 3,556,576 and 4,966,399, and Japanese Utility Model Application No. 55-160462. R.O.C. Patent Application NO. 74205214 which is owned by the Applicant of this application discloses a lock set shown in FIG. 1. The lock set comprises a turnable spindle A to move a limit plate B out of a tubular member C in a radial direction so that the limit plate B reaches a locking position in which it prevents an outer knob E from rotation thereby preventing a person from unlocking a door from the outside. When the lock set is to be opened, the spindle can be turned to move the limit plate inward of the tubular member C so that it is released from its locking position and the outer knob can be rotated. In this lock set, the locking and releasing operations thereof are controlled via the spindle A by turning a button F connected to the end of the spindle A in an inner knob H or by operating a key-operated lock G which is provided in the outer knob E. Like the lock sets disclosed in the above-mentioned other patents, the inner knob of the lock set of this R.O.C. patent application is of no effect in operating the spindle A to return from its locking position to its unlocking position. Such lock sets entail the inconvenience that the turning button must be rotated prior to rotating the inner knob when the door is opened at the inside thereof.

SUMMARY OF THE INVENTION

An object of this invention is to provide a lock set of the above-mentioned type with an improved spindle mechanism by which the inner knob of the lock set can be used to return the spindle to the unlocking position thereof from its locking position.

The present invention provides an improved lock set for use in combination with a deadbolt. The lock set comprises an outer knob assembly having an outer knob incorporating a key-operated lock member and a tubular member axially extending inward from an inner end thereof; an inner knob assembly having an inner knob incorporating a turning button therein; a deadbolt-actuating hollow shaft connected to said inner and outer knob assemblies so as to be rotated thereby, said shaft having a pedestal extending into said tubular member, a spindle connected to said turning button and said key-operated lock and passing through 5 said tubular member and said deadbolt-actuating hollow shaft, and a limit plate means provided in said tubular member adjacent said pedestal and sleeved around said spindle, said means being moved by said spindle between a locking position and an unlocking position. The improved lock set is characterized in that said pedestal is provided with a push means to push said limit plate means to return to said unlocking position after being placed in said locking position, and in that said limit plate means is provided with a cam means to permit said push means to act thereon during the pushing operation of said push means.

BRIEF DESCRIPTION OF THE DRAWINGS

The exemplary preferred embodiments will be described in detail with reference to the accompanying drawings, in which.

DETAILED DESCRIPTION OF THE PREFERRED EMBODIMENTS

Figure 1:
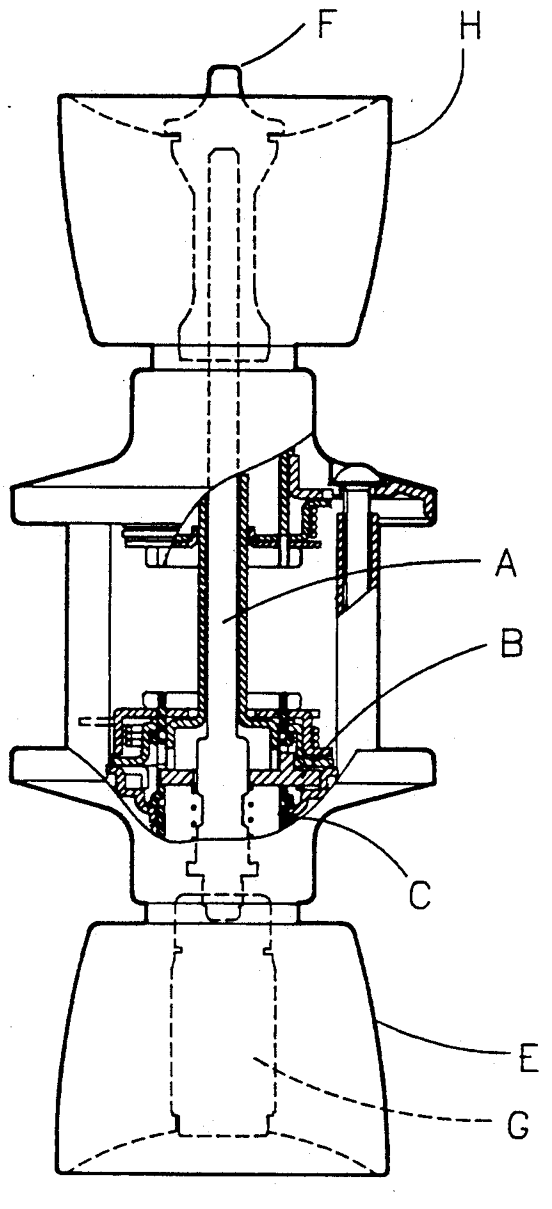
FIG. 1 PRIOR ART
FIG. 1 is an elevation view of a conventional lock set.
Figure 2:
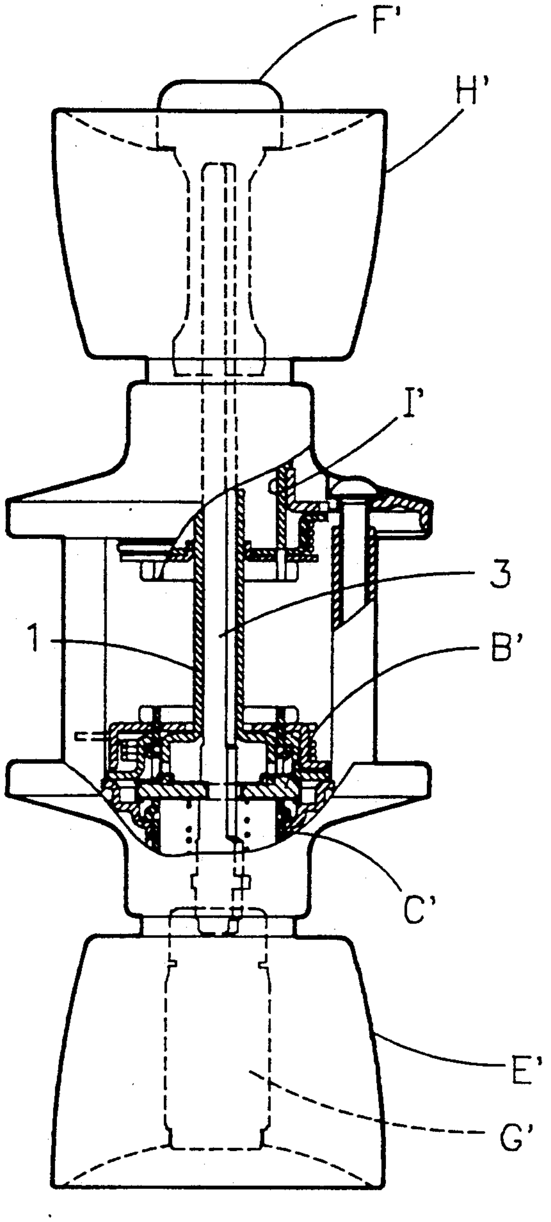
FIG. 2 is an elevation view of a lock set incorporating the present invention.
Figure 3:
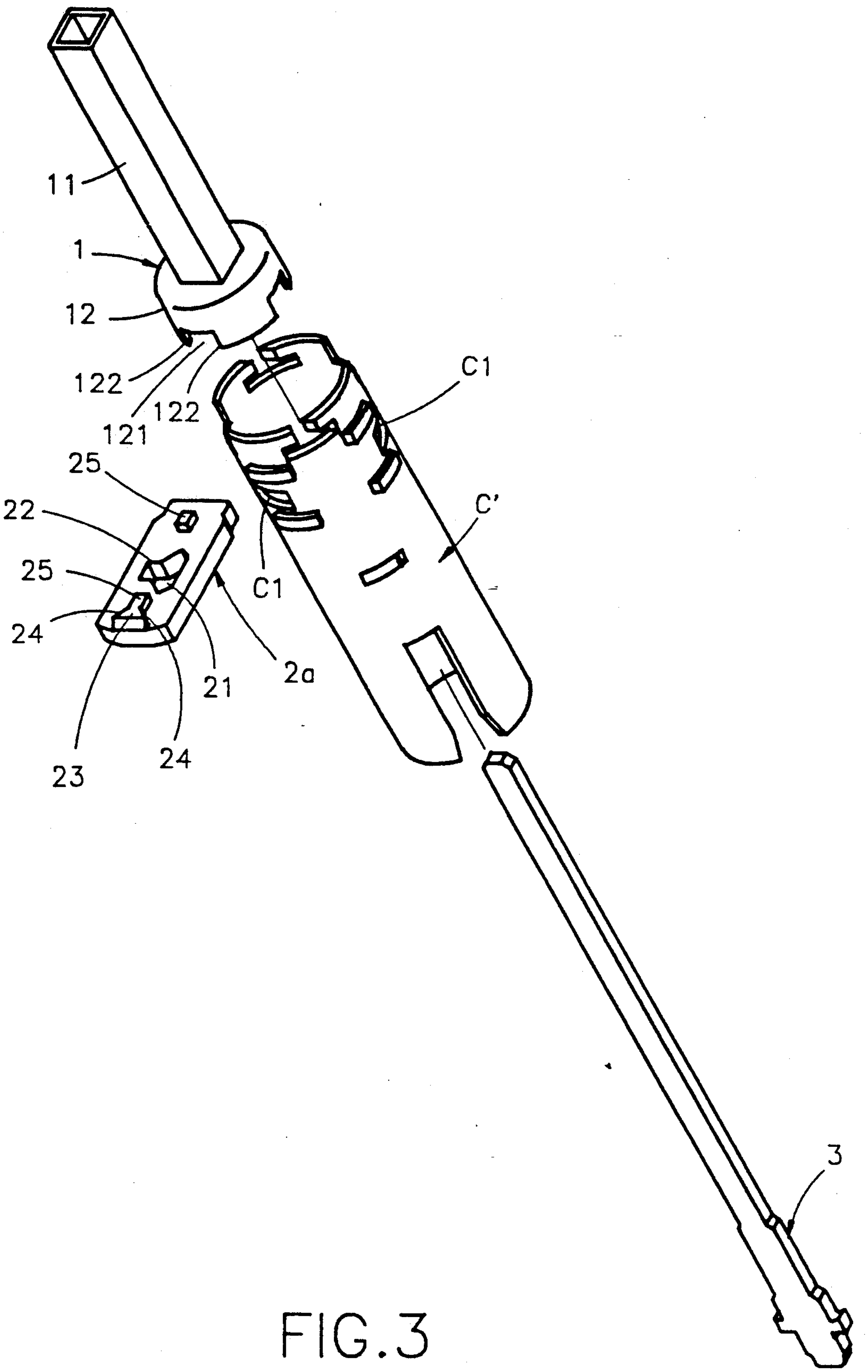
FIG. 3 is an exploded view showing an embodiment of the present invention.

The embodiments of this invention are described with reference to the drawings in which like elements are represented by like reference numerals. Referring to FIG. 2, an embodiment of the lock set of the present invention is shown, having an outer and an inner knob assembly. The outer knob assembly comprises an outer knob E′ incorporating a key-operated lock G′ and a tubular member C′ axially extending from an inner end thereof. The inner knob assembly comprises an inner knob H′ incorporating a turning button F′ therein and a tubular member I′ axially extending from an outer end thereof. Referring to FIG. 3 in combination with FIG.

2, a spindle 3 which has a flat rectangular cross-section is provided in the lock set in a conventional manner so as to extend from the turning button F' to the key-operated lock G' passing through the tubular members I' and C'. This spindle 3 can be manipulated by a user via the operation of the turning button F' or of the key-operated lock G' so as to prevent an unlatching operation using the outer knob E' from the outside of a door. A hollow shaft 1 is connected to the inner and outer knob assemblies in a conventional manner and is sleeved around the spindle 3. The hollow shaft 1 has a tubular portion 11 of rectangular cross-section and a pedestal 12 which has two pairs of diametrically opposite notches 121. The portion 11 is engaged with the tubular member I' of the inner knob assembly via an engagement member (not shown) in a conventional manner so that an actuating movement can be transmitted thereto from the inner knob assembly.

A limit plate 2*a* is provided in the tubular member C' and sleeved around the spindle 3 so as to be moved by the spindle to lock the outer knob assembly against movement or to release it therefrom. The main feature of the present invention resides in the construction of the limit plate 2*a*. The limit plate 2*a* is provided with a spindle slot 21 to permit the spindle to pass therethrough. Two engaging protrusions 25 are provided at two opposite sides of the spindle slot 21. The limit plate 2*a* further has a cam means integrally formed with and extending from one of the protrusions 25. The cam means is a wedge-shaped protrusion 23 and has two slanted cam faces diverging outward from the engaging protrusion 25.

Figure 5:
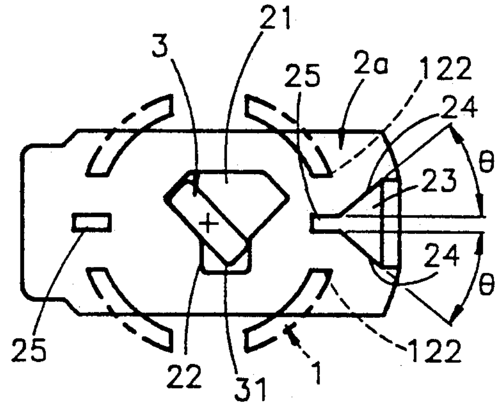
FIGS. 4 and 5 are fragmentary schematic views showing the relation between the hollow shaft, the limit plate and the spindle when the limit plate is in its unlocking position.
Figure 4:
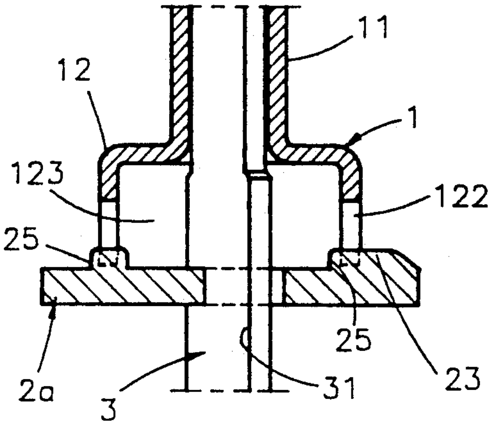

Like conventional lock sets, the engaging protrusions 25 of the limit plate 2*a* extend into two opposite notches 121 of the pedestal 12 of the hollow shaft 1 as shown in FIGS. 4 and 5 so that the hollow shaft 1 can engage the limit plate 2*a* and can be rotated via the tubular member C' when the outer knob assembly is turned. In this situation, the limit plate 2*a* has not been moved outward by the spindle 3 and therefore the limit plate 2*a* does not limit the rotation of the shaft 1 and the outer knob assembly. Furthermore, the spindle 3 contacts an engagement face 22 of the spindle slot of the limit plate 2*a*.

Figure 7:
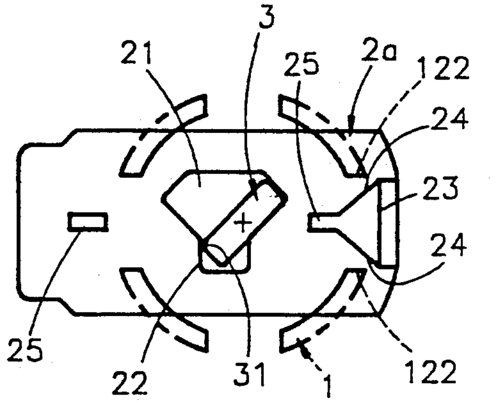
FIGS. 6 and 7 are fragmentary schematic view showing the relation between the hollow shaft, the limit plate and the spindle when the limit plate is in its locking position.
Figure 6:
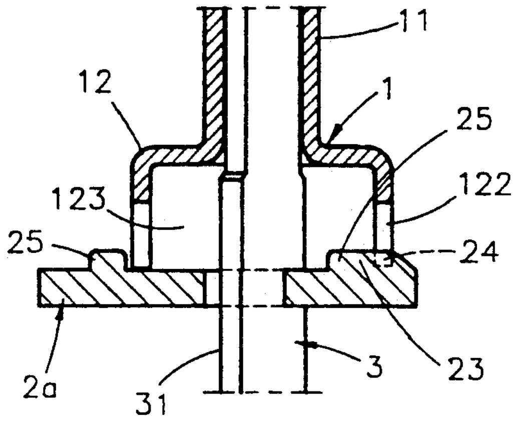

When the spindle 3 is turned clockwise, the push edge 31 thereof pushes the engagement face 22 of the spindle slot so that the limit plate 2*a* is pushed outward as shown in FIGS. 6 and 7 and so that the outer knob assembly is locked by the limit plate 2*a* against rotation in a conventional manner. In this situation, the cam faces 24 of the wedge-shaped cam means 23 move into between the push faces 122 of one the notches 121.

Figure 8:
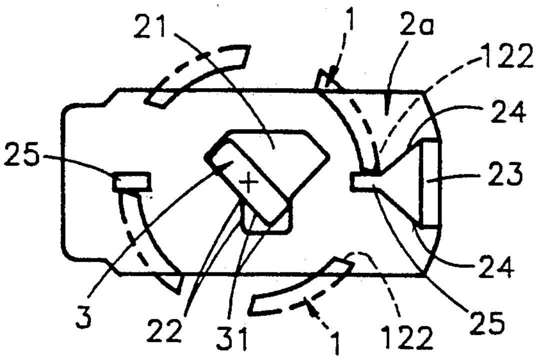
FIG. 8 shows that the limit plate is returned to its unlocking position.

The limit plate 2*a* in this locking position can be returned to its unlocking position (FIGS. 4 and 5) by turning the inner knob assembly through use of the cam means 23 of this invention. When the inner knob is turned to further rotate the hollow shaft clockwise, one of the push faces 122 of the pedestal 12 contacts one of the cam faces 24 and slides therealong thereby retracting the limit plate 2*a* and moving the engaging protrusion 25 inward. While the limit plate retracts, the engagement face 22 of the spindle slot 21 pushes the push edge 31 of the spindle so that the spindle is turned to the position shown in FIG. 8. The hollow shaft is returned to the position shown in FIG. 5 by a returning spring (not shown) in a known manner. The same effect can be achieved if the hollow shaft 1 is turned counterclockwise to push the other cam face 24 of the limit plate 2*a* with the other push face 122 of the pedestal 12.

It can be noted that the inclining angles $\theta$ of the cam faces 24 shown in FIG. 5 may be varied from 45-90 deg according to the desired displacement of the limit plate. Although this embodiment shows a wedge-shaped protrusion 23 for the cam means and the protrusion 23 is acted on by the push face 122 of the pedestal of the hollow shaft, this invention is not limited thereto. The protrusion of the cam means may be in other suitable shapes which can be acted on by the push face 122 of the pedestal.

Figure 9:
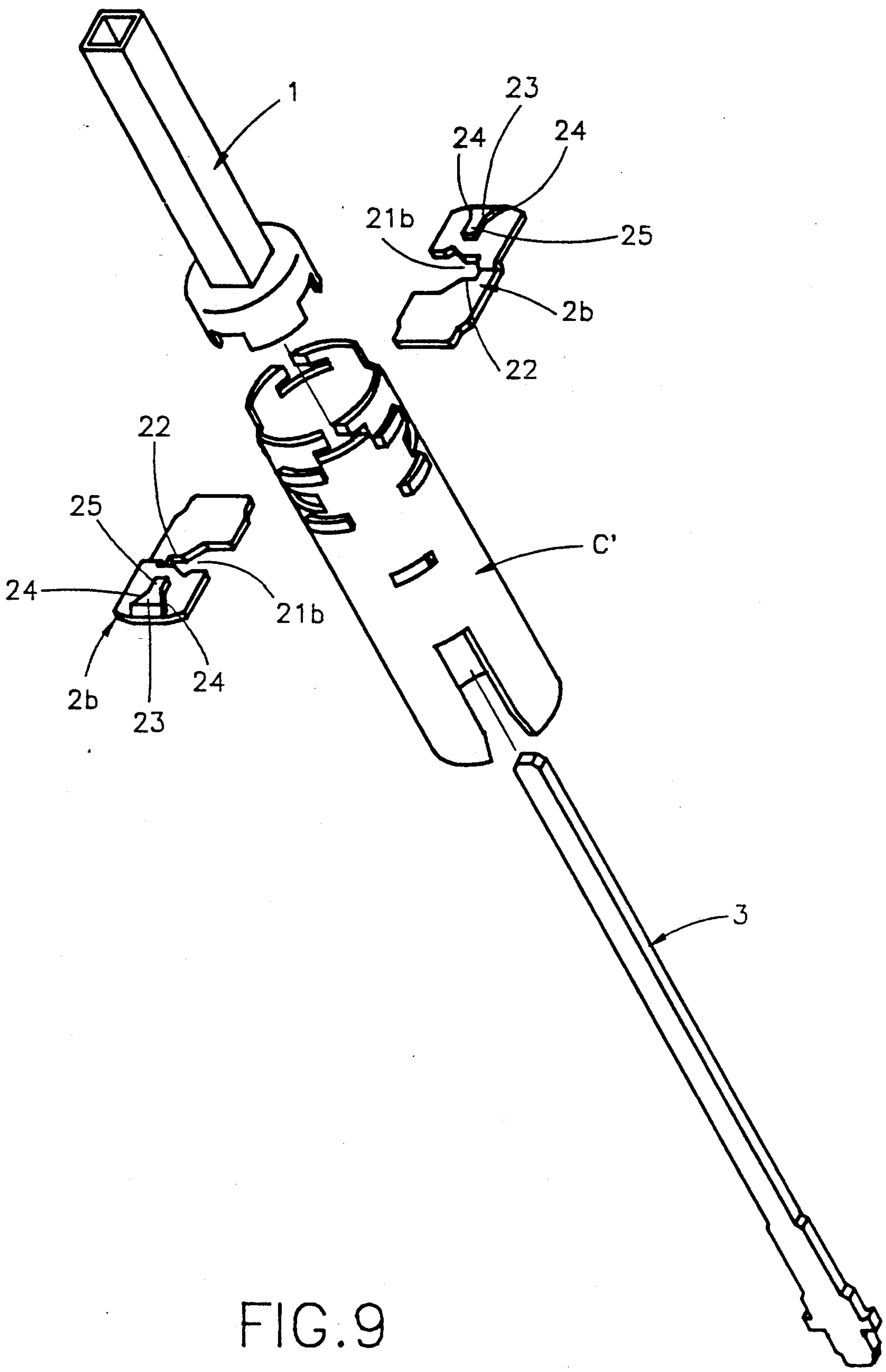
FIG. 9 shows a second embodiment of the present invention.

FIG. 9 shows another embodiment of this invention in which the limit plate 2*a* of FIG. 3 is replaced by two limit plates 2*b* which are bent to form two offset plane faces so that they can overlie one another and lie on the same plane. The spindle slot 21*b* of each limit plate 2*b* is opened at one side of the limit plate 2*b*. The two limit plates 2*b* are identical and their wedge-shaped protrusions 23 are arranged to oppose one another. Each limit plate 2*b* can function as the limit plate 2*a* of FIG. 3.

While, in the above embodiments, the engaging protrusion(s) of the limit plates are arranged such that they normally reside in the notches of the pedestal so as to directly engage therewith for simultaneous rotation, this invention is not limited thereto. Additional engaging means may be provided to interengage the limit plate and the pedestal as described in the following embodiments.

Figure 10:
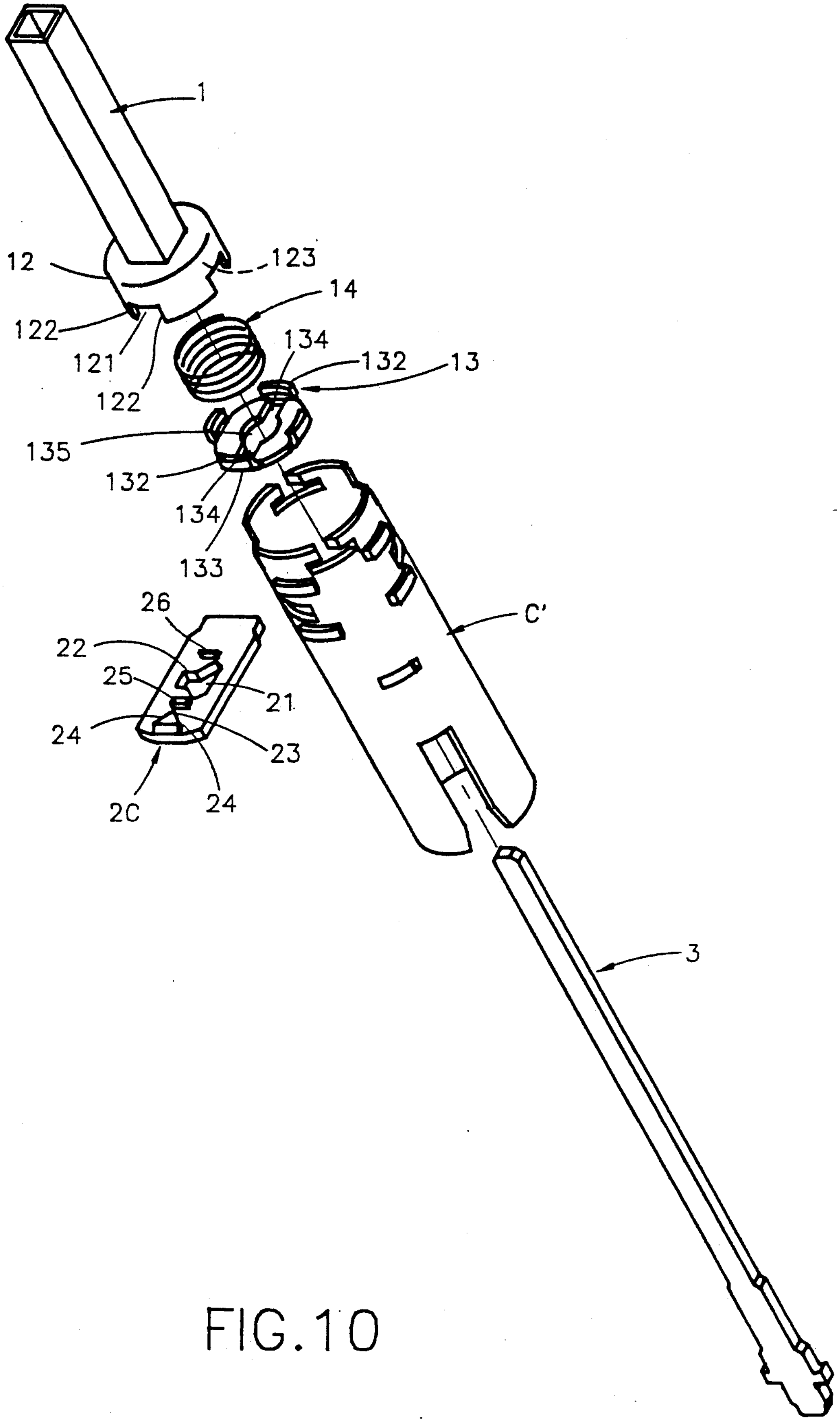
FIG. 10 shows a third embodiment of the present invention.

Referring to FIG. 10, a third embodiment is shown, having a clutch plate 13 and a spring 14 in addition to a limit plate 2C. The engaging protrusions 25 and 26 of the limit plate 2*c* are radially spaced from and reside inwardly of the notches 121 of the pedestal 12. The clutch plate 13 lies over the limit plate 2*c* and comprises opposite peripheral flanges 132 to engage the notches of the pedestal 12, a slanted engaging face 133 formed at one of the flanges 132 to be acted on by the wedge-shaped protrusion 23, a slot 135 to receive the spindle 3, and two slots 134 communicated with the slot 135 and extending to the peripheral flanges 132. The slots 134 provide spaces for receiving the engaging protrusions 25 and 26 when the limit plate is in its unlocking position. The spring 14 is provided in the interior of the pedestal 12 to urge the clutch plate 13 toward the limit plate 2*c* so that the engaging protrusions 25 and 26 are engaged in the slots 134 of the clutch plate 13 permitting a transmission movement between the hollow shaft 1 and the tubular member C'.

Figure 11:
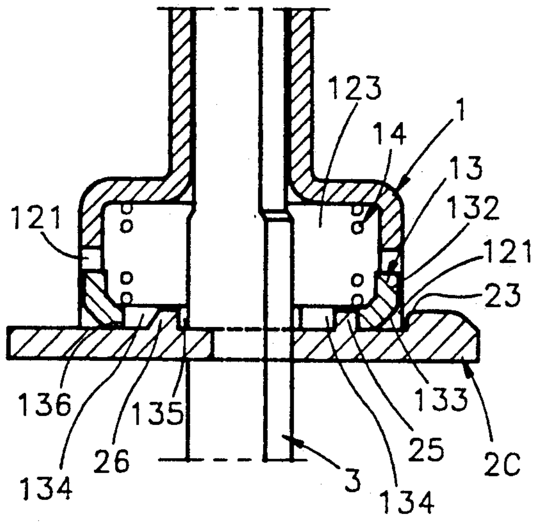
FIGS. 11 and 12 are fragmentary schematic views showing the relation between the hollow shaft, the limit plate and the spindle when the limit plate is in its unlocking and locking positions.
Figure 12:
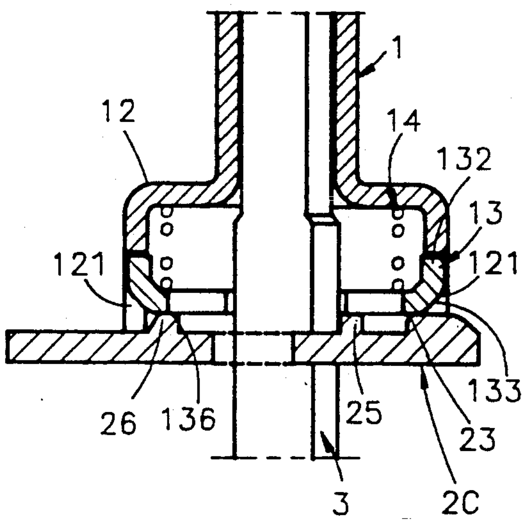

Referring to FIG. 11, when the limit plate is in the unlocking position, the engaging protrusions 25 and 26 are received in the slots 134 of the clutch plate 13 so that the inner and outer knob assemblies can be rotated simultaneously via a transmission movement along the hollow shaft 1, the clutch plate 13, the limit plate 2*c* and the tubular member C'. When the spindle 3 is rotated, the limit plate is moved radially outward. Accordingly, the engaging protrusion 26 and the wedge-shaped protrusion 23 are moved in the same direction as the limit plate 2*c* thereby pushing the clutch plate 13 axially toward the pedestal 12 and away from the limit plate 2*c* as shown in FIG. 12. In this situation, the engaging protrusions 25 and 26 disengage from the slots 134, thereby preventing a transmission movement from the tubular member C' to the hollow shaft 1 and permitting the hollow shaft to rotate only with the clutch plate 13. If the inner knob assembly is rotated to turn the hollow shaft, the push face 122 thereof pushes the cam face 24 of the limit plate 2*c* thereby returning the limit plate to the position shown in FIG. 11.

Figure 14:
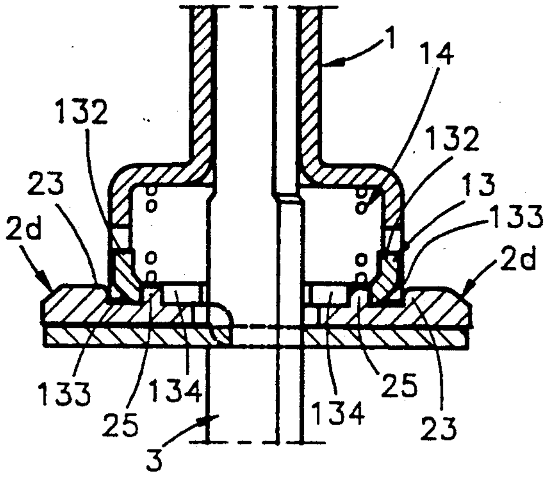
FIGS. 14 and 15 are fragmentary schematic view showing the relation between the hollow shaft, the limit plates and the spindle when the limit plates are in the unlocking and locking positions.

In a fourth embodiment, the limit plate 2c of the third embodiment can be replaced with two limit plates 2d like the second embodiment. When the limit plates 2d are used, their unlocking positions are shown in FIG. 14. The engaging protrusions 25 of the limit plates 2d are received in the slots 134 of the clutch plate 13 and the clutch plate itself is in contact with the limit plates 2d so that the hollow shaft can be rotated together with the tubular member C' of the outer knob assembly (not shown).

Figure 15:
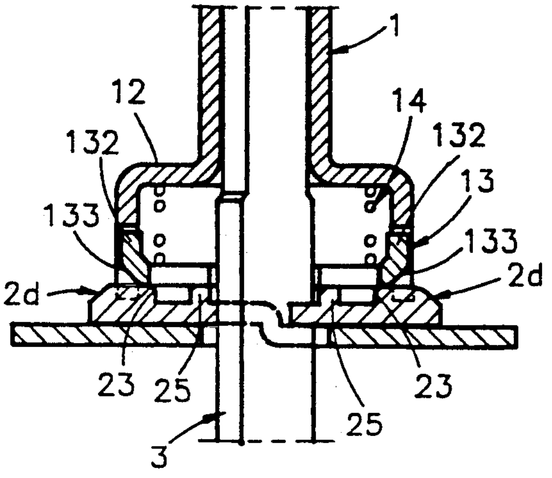

When the spindle 3 is rotated, the limit plates 2d are moved in two opposite radially outward directions. The wedge-shaped protrusions 23 of the limit plates 2d push the clutch plate 13 toward the pedestal 12 and away from the limit plates 2d as shown in FIG. 15. In this situation, the hollow shaft 12 can be rotated together with the clutch plate 13 but is prevented from rotation via the outer knob assembly, like the embodiment of FIGS. 11 and 12.

Figure 16:
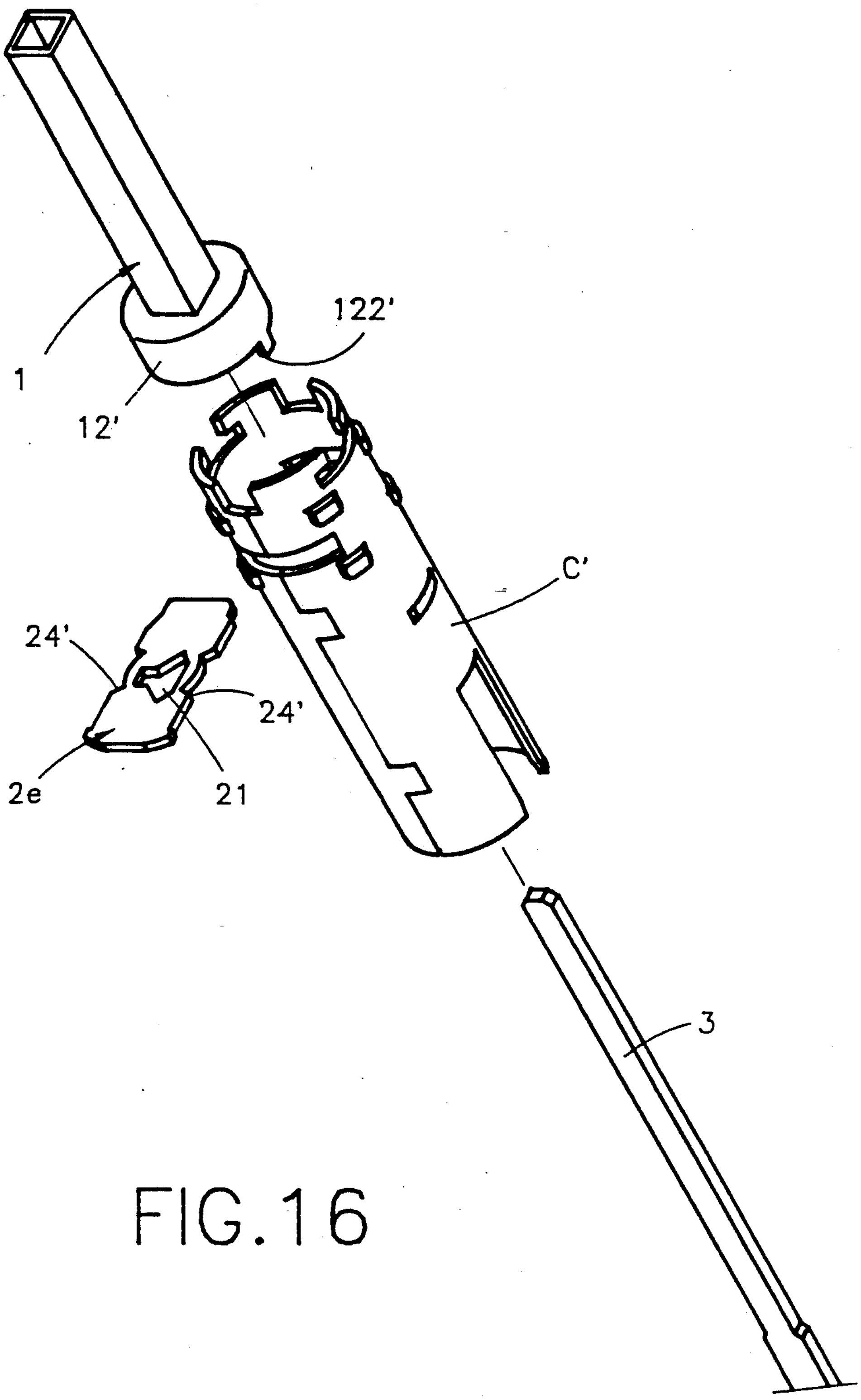
FIGS. 16–18 show a fifth embodiment of the present invention.
Figure 17:
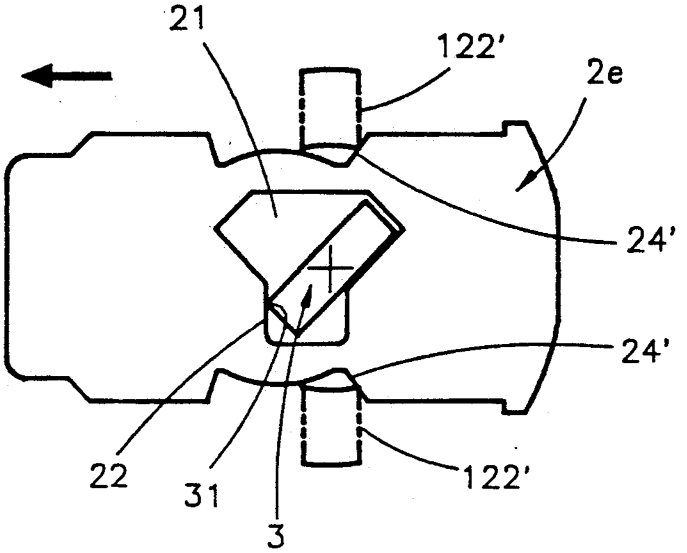

In a fifth embodiment shown in FIG. 16, the limit plate of this invention is configured to a plate 2e which comprises a spindle slot 21 and has a cam means in the form of two notched parts 24' provided at pedestal 12' of the dead-bolt operating shaft 1 has a push means comprising two opposite projections 122' extending axially from one end of the periphery of the pedestal 12' into the notched parts 24' respectively. The purpose of providing two projections 122' and two notched parts 24' is to enable the limit plate 2e to operate in two directions via the shaft 1 which can be rotated in a clockwise or counterclockwise direction. In operation, when the limit plate is in its locking position, the axial projection 122' is at the position shown in FIG. 17. When the shaft 1 is rotated clockwise, the projection 122' is turned clockwise and pushes one side of the notched part 24' thereby moving the limit plate 2e to the right.

Figure 19:
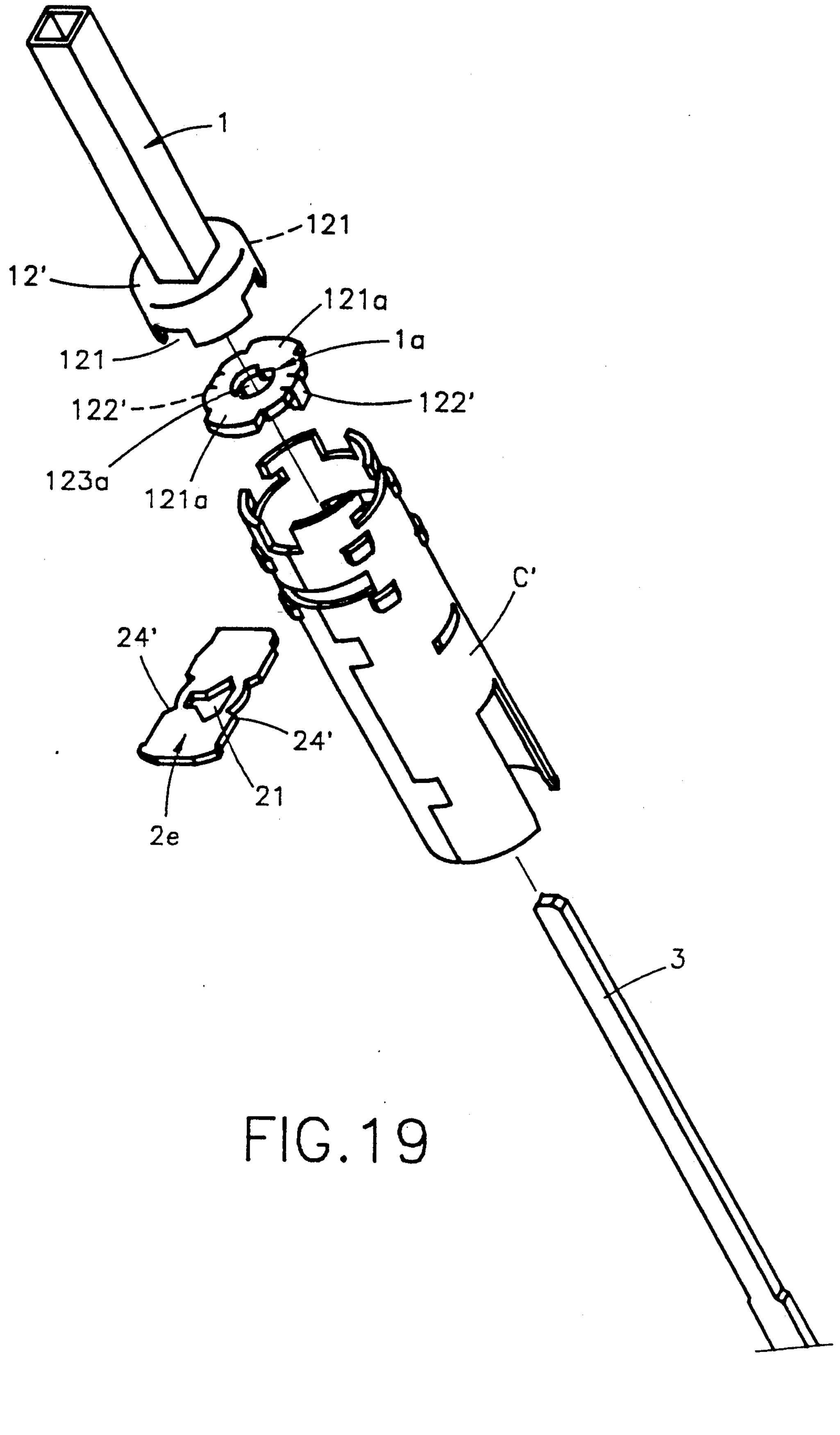
FIG. 19 shows a sixth embodiment of the present invention.

The sixth embodiment shown in FIG. 19 employs a limit plate 2e like the fifth embodiment. The dead-bolt operating shaft 1 is configured to have the same construction of the pedestal as the embodiments shown in FIGS. 1-13 and is additionally provided with a disc 1a to be received in the pedestal as a push means. The disc 1a has a central hole 123a, two opposite radial protrusions 121a to engage the notched parts 121 of the pedestal and two opposite axial protrusions 122' to act on the cam means of the limit plate 2e. In operation, the disc 1a is rotated simultaneously with the pedestal and the axial projection 122' of the disc 1a pushes the limit plate 2e like the axial projection 122' of the fifth embodiment.

Figure 20:
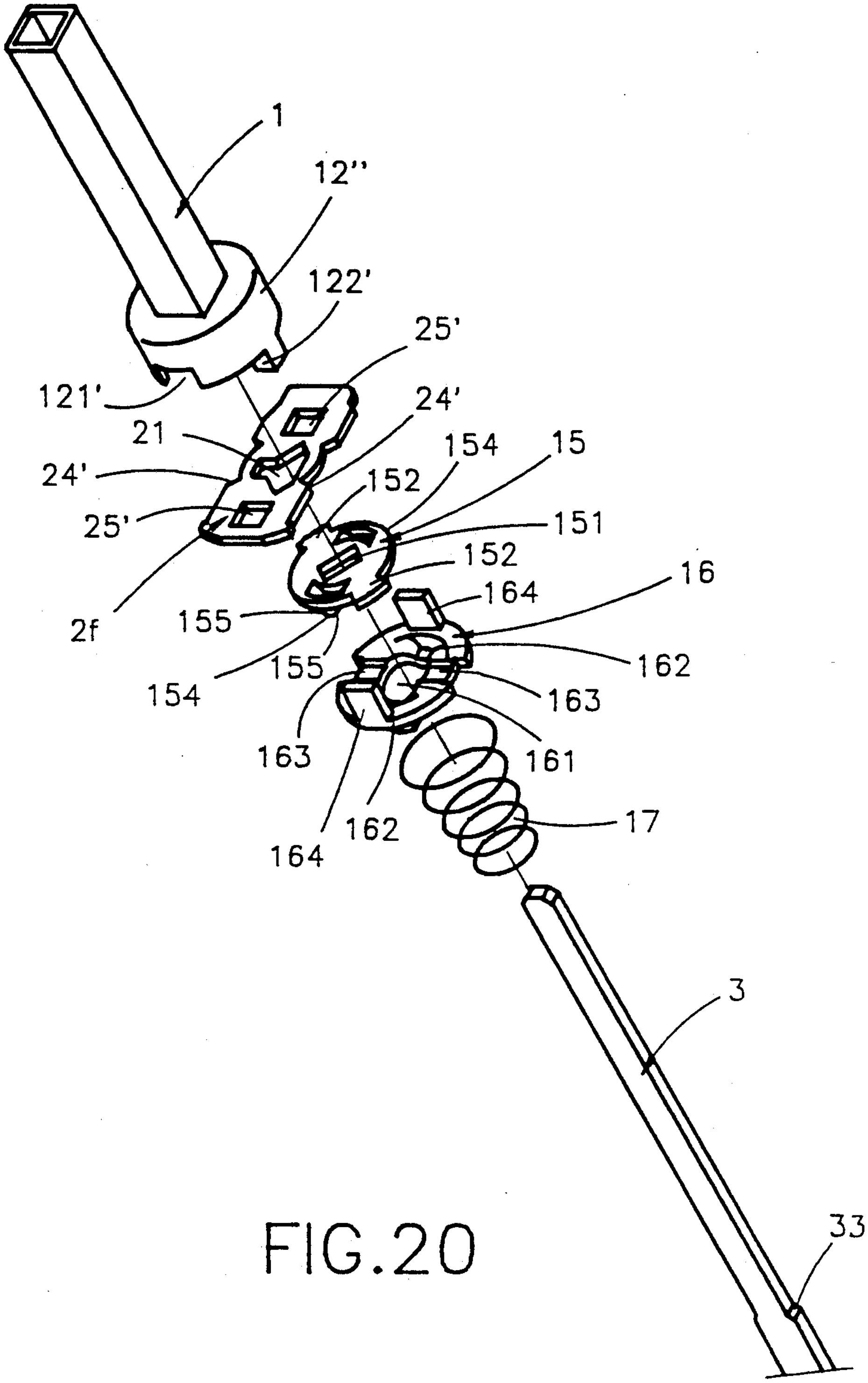
FIGS. 20–22 a seventh embodiment of the present invention.
Figure 21:
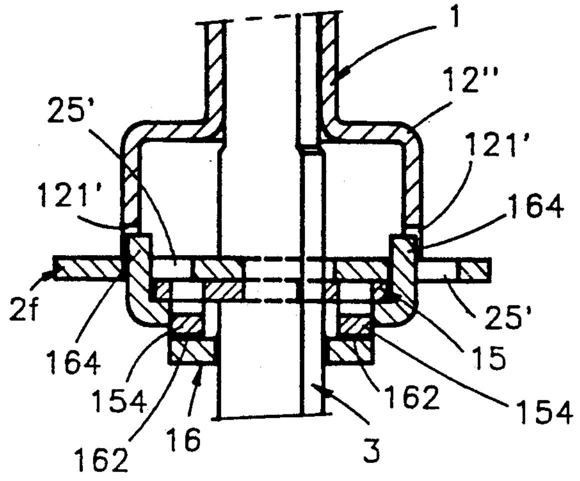
Figure 22:
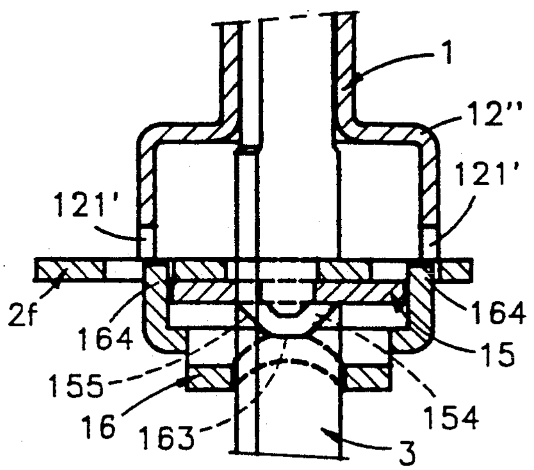

The seventh embodiment shown in FIGS. 20-22 employs a limit plate 2f which has a construction substantially similar to the limit plate 2e except that the limit plate 2f additionally has two engaging slots 25'. The dead-bolt actuating shaft 1 has a pedestal 12" which comprises two opposite notched parts 121' and which comprises two opposite axially extending projections 122' to serve as a push means. This embodiment further comprises an engaging plate member in the form of an annular plate 16 mounted in the tubular member C' to engage the pedestal 12" when the limit plate 2f is in its unlocking position. A rotary clutch plate 15 is provided between the limit plate 2f and the engaging plate member 16 to disengage the engaging plate member 16 from the pedestal 12". A spring 17 is sleeved around the spindle 3 in such a manner that one end of the spring 17 bears against a shoulder formation 33 of the spindle 3 and the other end thereof urges the engaging plate 16 to engage the pedestal 12".

The rotary clutch plate 15 is provided with a narrow and elongate slot 151 to be inserted by the spindle 3 for simultaneous rotation, two radial projection 152 at diametrically opposite positions and two opposite wedge-shaped cam members 154 projecting axially from one side of the rotary clutch plate 15 opposite to the limit plate. Each wedge-shaped cam member 154 has an inclined cam face 155.

The engaging plate member 16 comprises a central hole 161 for passage of the spindle 3, two wedge receiving cam grooves 162 provided at opposite sides of said central hole 161, two opposite shallow positioning grooves 163, respectively, spaced angularly from said cam grooves 162 by an angle of about 90 deg, and two tongues 164 axially projecting therefrom passing through the engaging slots 25' of the limit plate 2f to be engaged in the notched parts 121' of the pedestal 12". Normally, the cam grooves 162 respectively receive the wedge-shaped cam members 154 and the axial tongues 164 of the engaging plate 16 engage the notched parts 121' by the action of the spring 17 when the limit plate 2f is in its unlocking position as shown in FIG. 21. In this embodiment, the hollow shaft 1 and the tubular member C' can be rotated simultaneously unlike the embodiments which employ the limit plates 2a and 2b and in which the rotation of the tubular member C' lags behind the rotation of the shaft 1. This is because the engaging protrusions 25 of the limit plates 2a and 2b do not contact the face 122 of the periphery of the pedestal 12 at the commencement of the turning operation of the shaft 1 as shown in FIG. 7.

Figure 18:
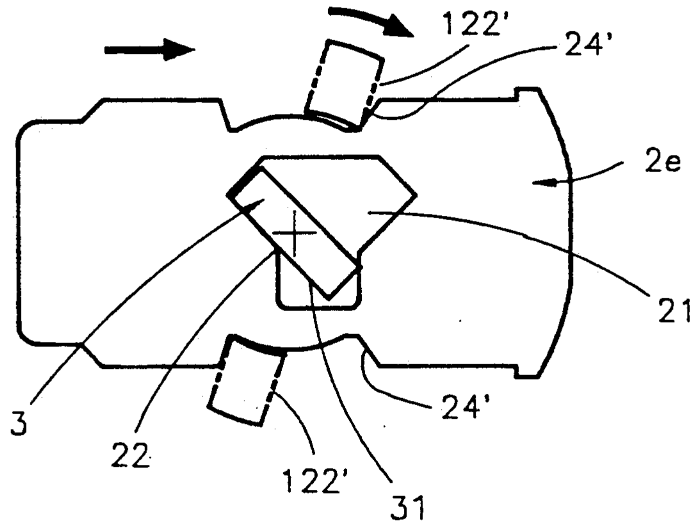

When the rotary clutch plate 15 is rotated by the spindle 3 via the outer knob assembly (not shown) during the locking operation, the cam faces 155 of the wedge-shaped cam members 154 of the rotary clutch plate 15 cam the cam grooves 162 of the engaging plate member 16, thereby moving axially the engaging plate member 16 against the action of the spring 17 and disengaging it from the notched parts 121' of the pedestal 12" of the shaft 1. When the spindle is turned by a predetermined angle i.e., about 90 deg, the wedge-shaped cam members 154 are positioned in the shallow grooves 163. In this situation, the engaging plate member 16 is disengaged from the pedestal 12" so that no transmission can occur between the tubular member C' and the shaft 1 as shown in FIG. 22. When the shaft 1 is rotated via the inner knob assembly (not shown) during the unlocking operation, the limit plate 2f can be moved by the pedestal 12" of the shaft 1 to the unlocking position and the spindle can be returned to its original position as described hereinabove with reference to FIGS. 17 and 18.

Figure 13:
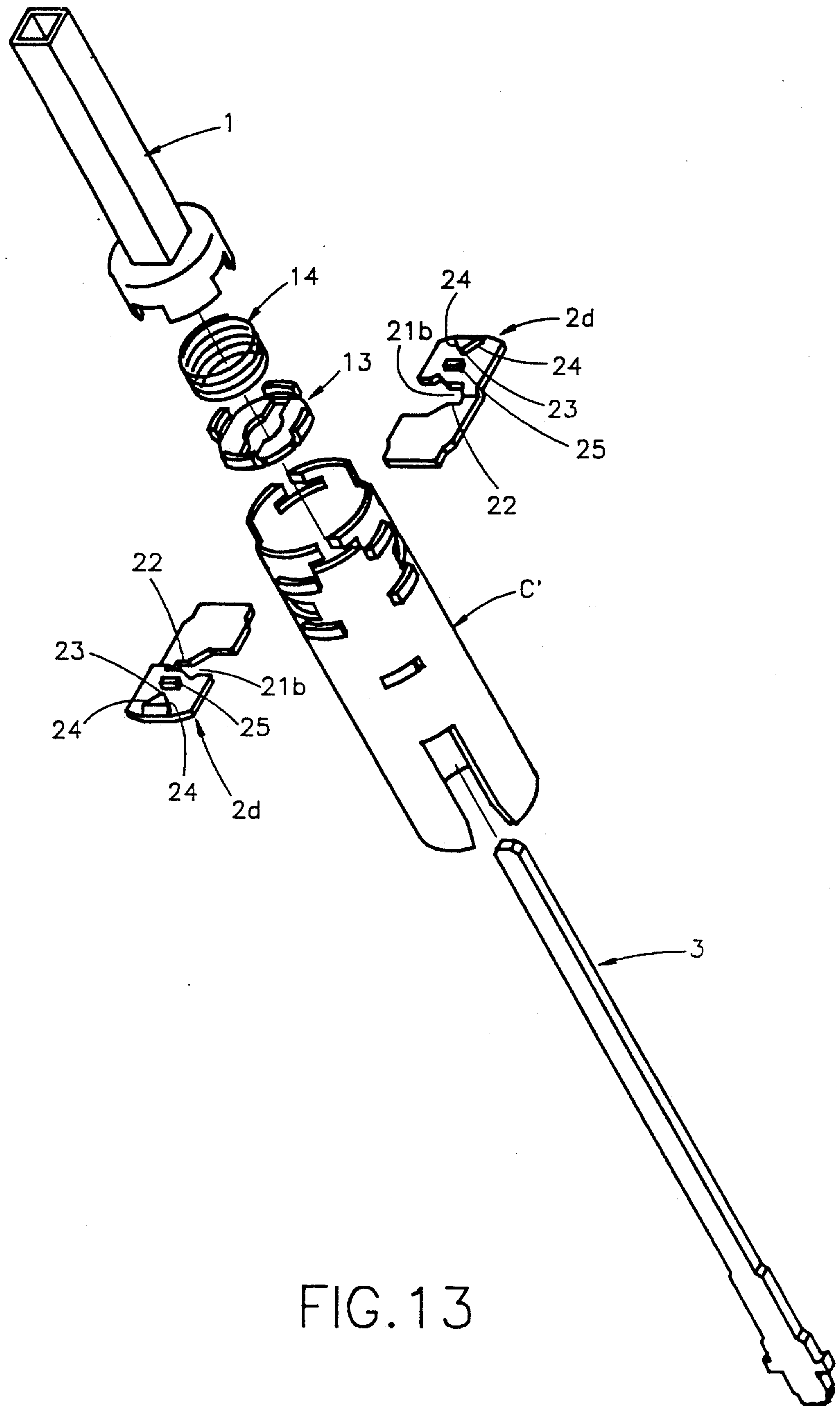
FIG. 13 shows a fourth embodiment of the present invention.
Figure 23:
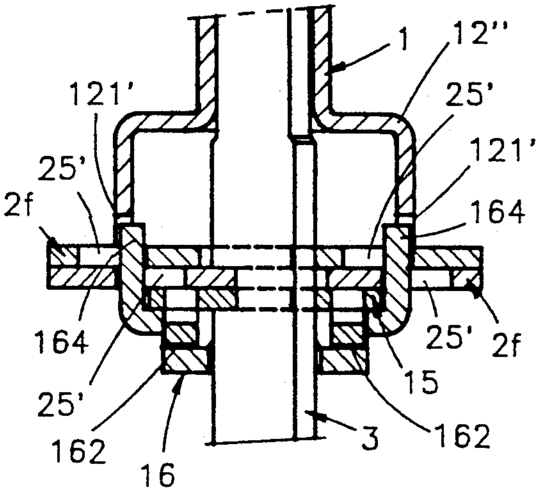
FIGS. 23–25 show an eighth embodiment of the present invention.
Figure 24:
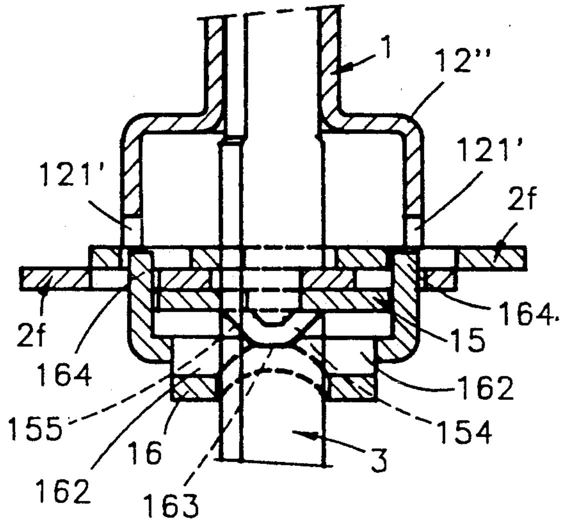
Figure 25:
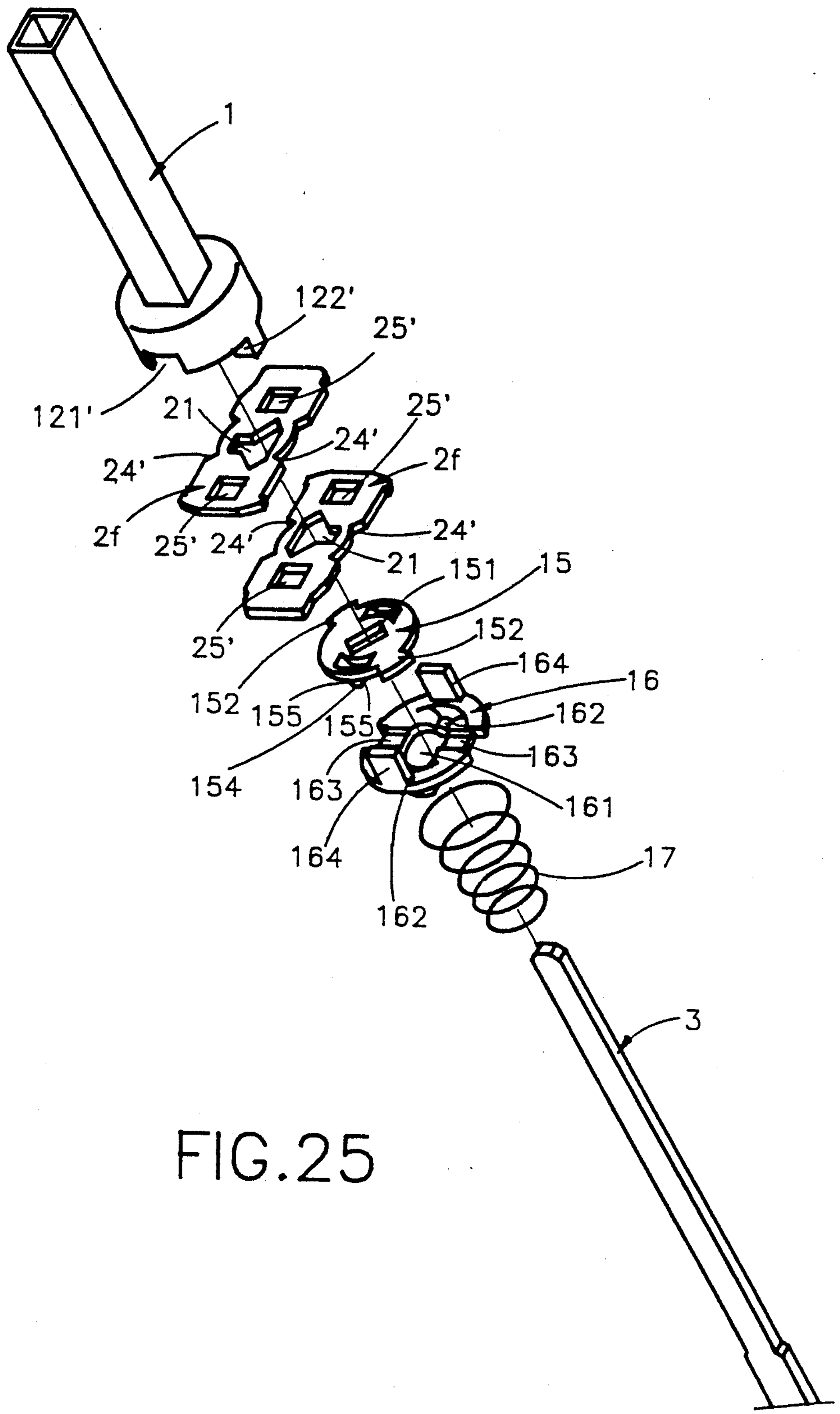

FIGS. 23-25 show an eighth embodiment which has a construction substantially similar to the embodiment of FIG. 20 except that this embodiment employs two limit plates 2f in order to achieve a stable continuous operation like the embodiment shown in FIG. 13. As shown in FIG. 23, when the limit plate 2f are in the unlocking position, the tongues 164 of the engaging plate member 16 extend into the slots 25' of the limit plates 2f and engage the notched parts 121' of the pedestal 12" thereby permitting a transmission movement between the tubular member C' and the shaft 1. When the spindle 3 is turned via the outer knob assembly in the locking operation, the limit plates 2f are moved outwards in opposite directions respectively by the two axial protrusions 122' of the pedestal 12" and the engaging plate member 16 is disengaged from the pedestal 12" of the shaft 1 as shown in FIG. 24.

We claim:

1. A lock set for use in combination with a deadbolt comprising:

an outer knob assembly having an outer knob incorporating a key-operated lock member and a tubular member axially extending inward from an inner end of said outer knob assembly:

an inner knob assembly having an inner knob incorporating a turning button means;

a deadbolt-actuating hollow shaft connected to said inner and outer knob assemblies so as to be rotated thereby, said shaft having a pedestal extending into said tubular member;

a spindle connected to said key-operated lock member and said turning button means, said spindle passing through said tubular member and said deadbolt-actuating hollow shaft; and a limit plate means provided in said tubular member adjacent to said pedestal and sleeved around said spindle, said limit plate means being movable diametrically, upon rotation of said spindle, between a locking position and an unlocking position, wherein said pedestal is further provided with a push means to transmit a push force to said limit plate means so as to move the limit plate means in a diametral direction to said unlocking position by rotating said inner knob assembly after the limit plate means has been placed in said locking position by turning said turning button means, and wherein said limit plate means includes a cam means to receive said push force when said inner knob assembly is rotated so as to cause said limit plate means to move to said unlocking position during the pushing operation of said push means whereby with the outer knob assembly locked by said limit plate means, rotation of the inner knob assembly produces unlocking of the outer knob assembly, said limit plate means also having a spindle pushing means so as to push said spindle to return to its original position when the limit plate means is moved to its unlocking position upon rotation of the inner knob assembly.

2. A lock set as claimed in claim 1, wherein said push means includes at least one notched part formed in said pedestal adjacent to said limit plate means, said notched part having a push face.

3. A lock set as claimed in claim 2, wherein said limit means comprises a limit plate, a spindle slot provided in said limit plate, and at least one engaging protrusion provided at one side of said spindle slot to project into said notched part and to interengage said pedestal and said limit plate, said cam means being located radially outward of said engaging protrusion and being in the form of a wedge-shaped protrusion on said limit plate, said wedge-shaped protrusion having at least one cam face to be acted on by said push face, said spindle pushing means being a push face formed in said spindle slot of said limit plate.

4. A lock set as claimed in claim 2, further comprising a clutch plate provided between said limit plate and said pedestal to releasably interengage said limit plate and said pedestal when said limit plate is in said unlocking position.

5. A lock set as claimed in claim 4, wherein said limit plate means comprises a limit plate, a spindle slot provided in said limit plate, and at least one engaging protrusion provided at one side of said spindle slot to engage said clutch plate, said cam means being provided radially outward of said engaging protrusion and being in the form of a wedge-shaped protrusion on said limit plate, said spindle pushing means being a push face formed in said spindle slot of said limit plate.

6. A lock set as claimed in claim 5, wherein said clutch plate comprises an axially extending peripheral flange to engage said notched part, and an engaging slot to engage said engaging protrusion of said limit plate.

7. A lock set as claimed in claim 2, wherein said limit plate means comprises two limit plates each of which is bent to form offset plane faces, said limit plates overlying one another so that they are on the same plane, each of said limit plates having a spindle slot and an engaging protrusion provided at one side of said spindle slot, said cam means comprising a wedge-shaped protrusion formed on each of said limit plates adjacent to said engaging protrusion, said spindle pushing means being a push face formed in said spindle slot of each of said limit plates.

8. A lock set as claimed in claim 1, wherein said push means comprises a push protrusion projecting axially from said pedestal adjacent to said limit plate means and wherein said limit plate means comprises a limit plate, said limit plate having a spindle slot provided in said limit plate, said cam means having at least one notched part which is provided at one edge of said limit plate means to be acted on by said push protrusion of said push means.

9. A lock set as claimed in claim 1, wherein said push means includes a disc member provided within said pedestal, said pedestal and said disc member having means for interengaging said pedestal and said disc member, said disc member further having a push projection axially extending from said disc member adjacent to said limit plate.

10. A lock set as claimed in claim 9, wherein said limit plate means comprises at least one limit plate, said limit plate having a spindle slot provided therein, said cam means having at least one notched part which is provided at one edge of said limit plate means to be acted by said push projection of said disc.

11. A lock set claimed in claim 1, wherein said pedestal comprises at least one notched part, said push means comprising a push protrusion projecting axially from said pedestal adjacent to said limit plate means, and wherein said limit plate means comprises a limit plate, said limit plate having a spindle slot provided in said limit plate, said cam means having at least one notched part which is provided at one edge of said limit plate means to be acted on by said protrusion of said push means.

12. A lock set as claimed in claim 11, further comprising an engaging plate member which is mounted to said tubular member and sleeved around said spindle adjacent to said limit plate and opposite said pedestal, a rotary clutch plate provided between said limit plate and said engaging plate member to disengage said engaging plate member from said pedestal, and means for urging said engaging plate member toward said pedestal.

13. A lock set as claimed in claim 12, wherein said engaging plate member has a central hole for passage of said spindle, at least one tongue axially extending from the periphery of said engaging plate member into said notched part of said pedestal, at least one cam groove provided on one side of said central hole, and at least one positioning groove provided at a predetermined angular distance from said cam groove.

14. A lock set as claimed in claim 13, wherein said limit plate further has at least one slot on one side of said spindle slot for passage of said tongue of said engaging plate member.

15. A lock set as claimed in claim 14, wherein said rotary clutch plate comprises a spindle slot in which said spindle is inserted for simultaneous rotation of said clutch plate and said spindle and at least one wedge-shaped cam member projecting from said rotary clutch plate into said cam groove.

16. A lock set as claimed in claim 1, further comprising an engaging plate member which is mounted to said tubular member and sleeved around said spindle to engage said pedestal, a rotary clutch plate to disengage said engaging plate member from said pedestal, and means for urging said engaging plate member toward said pedestal.

17. A lock set as claimed in claim 1 comprising means connecting said pedestal and said limit plate means to enable said inner knob assembly to be rotatable when the limit plate means is in said locking position, said outer knob assembly being blocked against rotation with said limit plate means in said locking position.

18. A lock set as claimed in claim 17, wherein said means connecting said pedestal and said limit plate means to enable said inner knob assembly to be rotatable when the limit plate means is in said locking position comprises a protrusion means on said limit plate means and a notch means in said pedestal, said protrusion means engaging said notch means when the limit plate means is in said unlocking position to connect said deadbolt-actuating hollow shaft to said inner and outer knobs for rotation by either of said knobs, and being free from said notch means when the limit plate means is in said locking position to block rotation of said outer knob while permitting rotation of the inner knob to operate said deadbolt-actuating hollow shaft.

* * * * *